United States Patent [19]

Hoshi et al.

[11] Patent Number: 5,301,040

[45] Date of Patent: Apr. 5, 1994

[54] IMAGE PROCESSING APPARATUS AND METHOD

[75] Inventors: Nobuhiro Hoshi, Yokohama; Kenichi Nagasawa, Kawasaki, both of Japan

[73] Assignee: Canon Kabushiki Kaisha, Tokyo, Japan

[21] Appl. No.: 872,144

[22] Filed: Apr. 22, 1992

[30] Foreign Application Priority Data

Apr. 23, 1991 [JP] Japan .................................. 3-092301

[51] Int. Cl.$^5$ .................. H04N 7/12; H04N 1/419; H04N 1/415; H04N 1/00
[52] U.S. Cl. .................. 358/465; 358/261.2; 358/261.3; 358/401; 348/384; 348/415
[58] Field of Search ............ 358/465, 400, 401, 261.1, 358/261.2, 261.3, 133, 136

[56] References Cited

U.S. PATENT DOCUMENTS

| | | | |
|---|---|---|---|
| 3,992,697 | 11/1976 | Knab et al. | 382/48 |
| 4,371,895 | 2/1983 | Koga | 358/136 |
| 4,797,945 | 1/1989 | Suzuki et al. | 382/56 |
| 4,887,151 | 12/1989 | Wataya | 358/80 |
| 4,903,124 | 2/1990 | Hoshi et al. | 358/133 |
| 4,974,071 | 11/1990 | Maeda | 358/80 |
| 5,023,919 | 6/1991 | Wataya | 382/54 |
| 5,086,439 | 2/1992 | Asai et al. | 358/133 |
| 5,089,888 | 2/1992 | Zdepski et al. | 358/133 |
| 5,162,923 | 11/1992 | Yoshida et al. | 358/433 |

FOREIGN PATENT DOCUMENTS

| | | |
|---|---|---|
| 0400756 | 12/1990 | European Pat. Off. . |
| 0401854 | 12/1990 | European Pat. Off. . |
| 0469648 | 2/1992 | European Pat. Off. . |
| 0475251 | 3/1992 | European Pat. Off. . |
| 4034535 | 5/1991 | Fed. Rep. of Germany . |

Primary Examiner—Edward L. Coles, Sr.
Assistant Examiner—Kimberly A. Williams
Attorney, Agent, or Firm—Fitzpatrick, Cella, Harper & Scinto

[57] ABSTRACT

An apparatus is provided for quantizing data obtained by transforming image data to a frequency zone so as to encode it. The speed at which such an apparatus performs processing is increased. Data is quantized on the basis of a plurality of coefficients $C_1$ for controlling a quantizing step. As a result of the quantization, reference encoding data items $Nb_1$ to $Nb_4$ are obtained. Coefficients $C_5$ to $C_7$ for controlling the quantizing step are generated when image data which is delayed by one frame is quantized. At this time, the data items $Nb_1$ to $Nb_4$ are output by bit-shifting the result of the quantization.

8 Claims, 4 Drawing Sheets

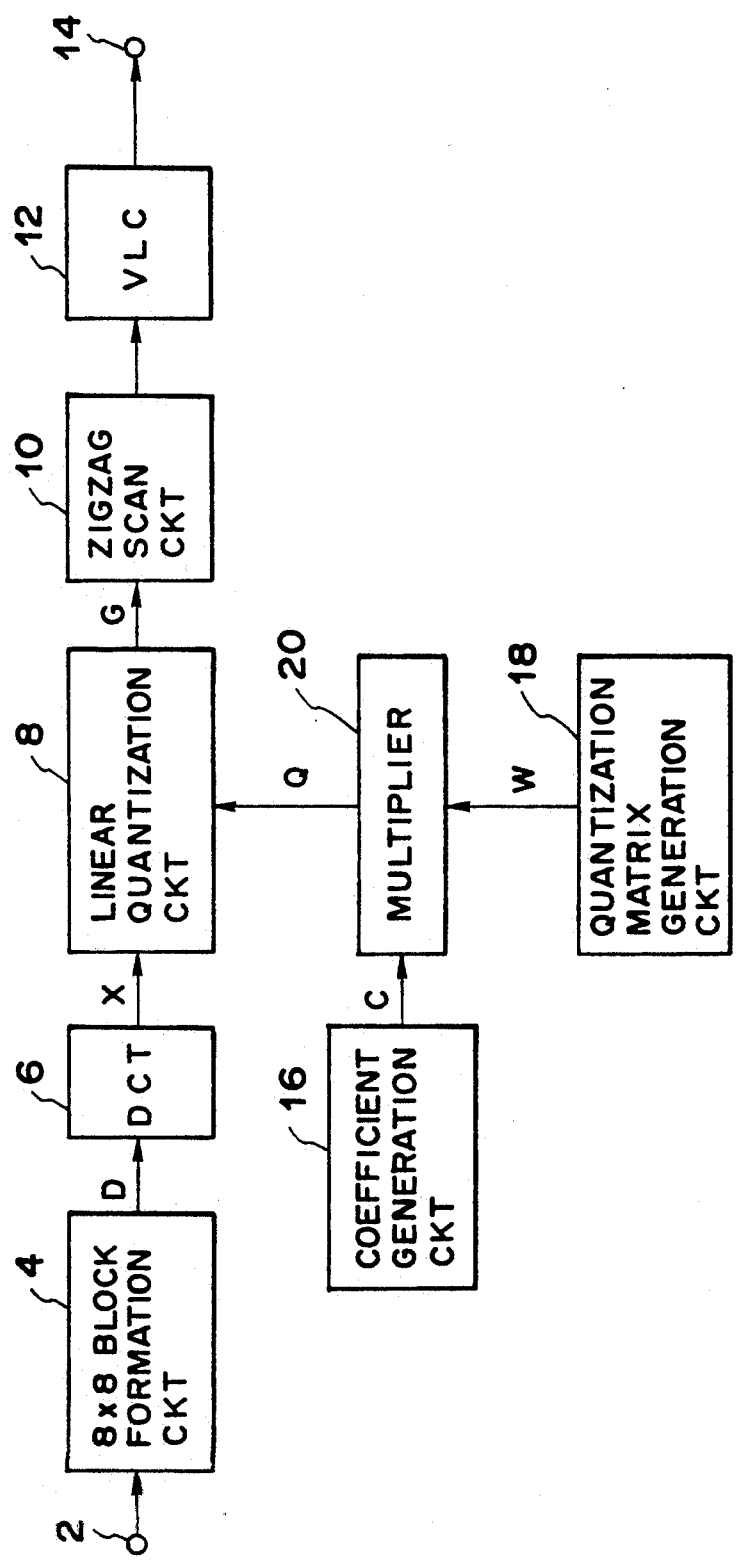

FIG. 4A

| $D_{11}$ | $D_{12}$ | $D_{13}$ | $D_{14}$ | $D_{15}$ | $D_{16}$ | $D_{17}$ | $D_{18}$ |
|---|---|---|---|---|---|---|---|
| $D_{21}$ | $D_{22}$ | $D_{23}$ | $D_{24}$ | $D_{25}$ | $D_{26}$ | $D_{27}$ | $D_{28}$ |
| $D_{31}$ | $D_{32}$ | $D_{33}$ | $D_{34}$ | $D_{35}$ | $D_{36}$ | $D_{37}$ | $D_{38}$ |
| $D_{41}$ | $D_{42}$ | $D_{43}$ | $D_{44}$ | $D_{45}$ | $D_{46}$ | $D_{47}$ | $D_{48}$ |
| $D_{51}$ | $D_{52}$ | $D_{53}$ | $D_{54}$ | $D_{55}$ | $D_{56}$ | $D_{57}$ | $D_{58}$ |
| $D_{61}$ | $D_{62}$ | $D_{63}$ | $D_{64}$ | $D_{65}$ | $D_{66}$ | $D_{67}$ | $D_{68}$ |
| $D_{71}$ | $D_{72}$ | $D_{73}$ | $D_{74}$ | $D_{75}$ | $D_{76}$ | $D_{77}$ | $D_{78}$ |
| $D_{81}$ | $D_{82}$ | $D_{83}$ | $D_{84}$ | $D_{85}$ | $D_{86}$ | $D_{87}$ | $D_{88}$ |

FIG. 4B

| $X_{11}$ | $X_{12}$ | $X_{13}$ | $X_{14}$ | $X_{15}$ | $X_{16}$ | $X_{17}$ | $X_{18}$ |
|---|---|---|---|---|---|---|---|
| $X_{21}$ | $X_{22}$ | $X_{23}$ | $X_{24}$ | $X_{25}$ | $X_{26}$ | $X_{27}$ | $X_{28}$ |
| $X_{31}$ | $X_{32}$ | $X_{33}$ | $X_{34}$ | $X_{35}$ | $X_{36}$ | $X_{37}$ | $X_{38}$ |
| $X_{41}$ | $X_{42}$ | $X_{43}$ | $X_{44}$ | $X_{45}$ | $X_{46}$ | $X_{47}$ | $X_{48}$ |
| $X_{51}$ | $X_{52}$ | $X_{53}$ | $X_{54}$ | $X_{55}$ | $X_{56}$ | $X_{57}$ | $X_{58}$ |
| $X_{61}$ | $X_{62}$ | $X_{63}$ | $X_{64}$ | $X_{65}$ | $X_{66}$ | $X_{67}$ | $X_{68}$ |
| $X_{71}$ | $X_{72}$ | $X_{73}$ | $X_{74}$ | $X_{75}$ | $X_{76}$ | $X_{77}$ | $X_{78}$ |
| $X_{81}$ | $X_{82}$ | $X_{83}$ | $X_{84}$ | $X_{85}$ | $X_{86}$ | $X_{87}$ | $X_{88}$ |

FIG. 4C

| $W_{11}$ | $W_{12}$ | $W_{13}$ | $W_{14}$ | $W_{15}$ | $W_{16}$ | $W_{17}$ | $W_{18}$ |
|---|---|---|---|---|---|---|---|
| $W_{21}$ | $W_{22}$ | $W_{23}$ | $W_{24}$ | $W_{25}$ | $W_{26}$ | $W_{27}$ | $W_{28}$ |
| $W_{31}$ | $W_{32}$ | $W_{33}$ | $W_{34}$ | $W_{35}$ | $W_{36}$ | $W_{37}$ | $W_{38}$ |
| $W_{41}$ | $W_{42}$ | $W_{43}$ | $W_{44}$ | $W_{45}$ | $W_{46}$ | $W_{47}$ | $W_{48}$ |
| $W_{51}$ | $W_{52}$ | $W_{53}$ | $W_{54}$ | $W_{55}$ | $W_{56}$ | $W_{57}$ | $W_{58}$ |
| $W_{61}$ | $W_{62}$ | $W_{63}$ | $W_{64}$ | $W_{65}$ | $W_{66}$ | $W_{67}$ | $W_{68}$ |
| $W_{71}$ | $W_{72}$ | $W_{73}$ | $W_{74}$ | $W_{75}$ | $W_{76}$ | $W_{77}$ | $W_{78}$ |
| $W_{81}$ | $W_{82}$ | $W_{83}$ | $W_{84}$ | $W_{85}$ | $W_{86}$ | $W_{87}$ | $W_{88}$ |

FIG. 4D

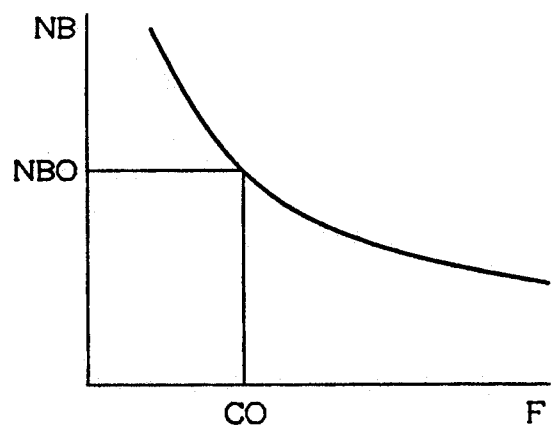

IMAGE PROCESSING APPARATUS AND METHOD

BACKGROUND OF THE INVENTION

1. Field of the Invention

The present invention relates to an apparatus and method for encoding an image. More particularly, it pertains to an apparatus and method for quantizing conversion data obtained by transforming image information to a frequency space so as to encode such data.

2. Related Background Art

An Adaptive Discrete Cosine Transformation (ADCT) encoding system used as a method for encoding color image signals has gained attention in recent years. A Joint Photographic Expert Group (JPEG), which was founded as an international organization for standardizing such an encoding system, will soon adapt the ADCT encoding system as an official encoding system.

The outline of such an encoding system will be described briefly.

FIG. 3 is a block diagram illustrating the approximate structure of a conventional encoding system utilizing DCT. FIGS. 4A to 4D are views illustrating the encoding system shown in FIG. 3. Numeral 2 denotes an input terminal of a digital image signal to be encode. A raster scanned digital image signal is input from a CCD sensor (not shown) to the input terminal 2, and then to an 8×8 block formation circuit 4, where it is two dimensionally divided into 8×8 pixel blocks, and then transmitted pixel block by pixel block to components connected to the formation circuit 4.

Numeral 6 denotes a DCT converting circuit for changing the image signal transmitted from the block formation circuit 4 into discrete cosine transformation so as to output 8×8 data matrices regarding a frequency zone. In other words, the DCT converting circuit 6 converts pixel blocks forming image data items $D_{11}$ to $D_{88}$ shown in FIG. 4A into data matrices forming DCT coefficients $X_{11}$ to $X_{88}$ shown in FIG. 4B.

Data matrix coefficient $X_{11}$ represents a DC component in horizontal and vertical directions of the pixel block, that is, the average value of the pixel block. When the DCT coefficients $X_{11}$ to $X_{88}$ are expressed as $X_{ij}$, the greater the "i" increases, the higher the frequency a component has in the vertical direction; similarly, the greater the "j" increases, the higher the frequency the component has in the horizontal direction.

The data matrices output from the DCT converting circuit 6 are input to a linear quantization circuit 8. A quantization matrix generation circuit 18 generates quantization matrices $W_{11}$ to $W_{88}$ (shown in FIG. 4C) which show the weight of a step of quantizing the DCT coefficients $X_{11}$ to $X_{88}$. A coefficient generation circuit 16 generates coefficients C. The quantization matrices $W_{11}$ to $W_{88}$ and the coefficients C are input to a multiplier 20. The multiplier 20 calculates an equation ($W_{ij} \times C/C_0$). A quantizing step performed by the linear quantization circuit 8 is determined in accordance with the outputs $Q_{11}$ to $Q_{88}$ of the multiplier 20. The coefficients C are positive values which control image quality and the amount of data generated, whereas $C_0$ is a constant.

The linear quantization circuit 8 actually calculates an equation $X_{ij}/Q_{ij}$, and outputs it. The outputs of the linear quantization circuit 8 are expressed as quantized conversion data items $G_{11}$ to $G_{88}$. The quantized data items $G_{11}$ to $G_{88}$ are successively transmitted starting from DC components from a zigzag scan circuit 10. In other words, the data items $G_{11}$ to $G_{88}$ are supplied from the zigzag circuit 10 to a Variable Length Coding (VLC) circuit 12 in the order of $G_{11}$, $G_{12}$, $G_{21}$, $G_{31}$, $G_{22}$, $G_{13}$, $G_{14}$, $G_{23}$, $G_{32}$, $G_{41}$ ... $G_{85}$, $G_{86}$, $G_{77}$, $G_{68}$, $G_{78}$ and $G_{88}$.

As regards, for example, a DC component $G_{11}$, the VLC circuit 12 calculates a predicted value between pixel blocks located near the DC component $G_{11}$, and changes a difference between the predicted value and an actual value into a Huffman code. As regards AC components $G_{12}$ to $G_{88}$, since most of the coefficients appear to be zeros, group ID numbers, which identify groups into which significant coefficients except zero are divided according to the values of the significant coefficients, and values combined with the number of zeros preceded by the significant coefficients (run length of zeros) are formed into Huffman codes by the VLC circuit 12. Data indicating values in the groups, into which the significant coefficients are divided, is additionally coded.

In general, since the ratio at which high-frequency components occur in the diagonal direction of an image is low, it is predicted that, after zigzag scanning has been performed, in many cases all components become zero which occupy the latter half of the outputs represented by $G_{ij}$ and transmitted from the line quantization circuit 8. It is therefore expected that variable length codes thus obtained can be compressed at a very high ratio. If a compression ratio between 1 out of 2 and 1 out of 9 is employed, it is possible to reproduce an image having hardly deteriorated quality.

Generally, the amount of data transmitted through a transmission route per unit time is fixed. When one screen must be transmitted at each predetermined time interval, as when an image is transmitted, it is desirable that an output code be represented by a bit number fixed by an image or pixel block unit.

If a high value is given to the coefficients C mentioned previously, the ratio at which $G_{ij}$ assumes zero increases and the total number of bits of encoded data NB decreases. The relationship between the coefficients C and the total number of bits NB varies according to images, and is expressed by a monotonically decreasing function. It is known that such a relationship regarding an average image is expressed by the logarithmic curve shown in FIG. 4D.

The above-mentioned JPEG presents a method of predicting a coefficient $C_0$ for obtaining the desired total number of bits NB0. A coefficient $C_1$ is first encoded, and then the total number of bits nb1 of a thus-obtained code is determined. A predicted value $C_2$ of the coefficient $C_0$ is calculated on the basis of the total number of bits nb1. Such calculation can be predicted because the logarithmic curve shown in FIG. 4D runs through a point ($C_1$, nb1).

By repeating the above operation several times, the amount of data encoded can be obtained within approximately several % errors with respect to the desired total number of bits NB0.

However, the process of repeatedly encoding data so as to determine the coefficients C is a very time-consuming process, and is not suitable for an encoding apparatus which is required to transmit one screen at predetermined time intervals, such as moving images. Such a process is extremely difficult to perform in terms of calculation speed, particularly when image signals of a very high bit rate, such as high definition television signals, are handled.

SUMMARY OF THE INVENTION

The present invention has been made in view of the above problems, and an object thereof is to provide a simply-constructed image processing apparatus suitable for obtaining a predetermined amount of encoded data.

To achieve the above object, in accordance with one aspect of this invention, an image processing apparatus comprises input means for inputting image data; quantizing means for quantizing the image data and outputting quantized digital data; first encoding means for encoding the quantized digital data and outputting first encoded data; second encoding means for encoding bit shifted quantized digital data and outputting second encoded data; and calculating means for calculating a suitable quantizing parameter for quantizing the image data in accordance with the first and second encoded data.

Another object of this invention is to provide an encoding method suitable for encoding moving images.

A further object is to provide a high-speed encoding method.

The embodiments and other objects of this invention will become apparent from the description and claim taken in connection with the following drawing.

BRIEF DESCRIPTION OF THE DRAWINGS

FIG. 3 is a view showing the conventional art; and

FIGS. 4A to 4D are views illustrating the encoding method shown in FIG. 3.

DESCRIPTION OF THE PREFERRED EMBODIMENTS

According to the embodiments of the present invention which will be described below, an encoding apparatus, which quantizes data obtained by transforming image information to a frequency zone and then forms such data into variable length codes, comprises a plurality of quantizing means, a calculating means, a calculating and generating means, and a selecting means. The quantizing means perform control on the basis of a first set of control coefficients; the calculating means calculates the amount of data when a plurality of quantized data are formed into variable length codes; the calculating and generating means calculates and generates a second set of control coefficients; and the selecting means selects outputs which are quantized and formed into variable length codes using the second set of control coefficients.

Because of the structure as described above, the control coefficients obtained by a second quantizing means approach desired values as compared with a first quantizing means. Control coefficients substantially close to the desired control coefficients can be obtained. Since it is not necessary to repeatedly encode data and calculate the control coefficients, a process can be performed at extremely high speed. The apparatus can be thoroughly applied to processing moving images.

Figure 1:
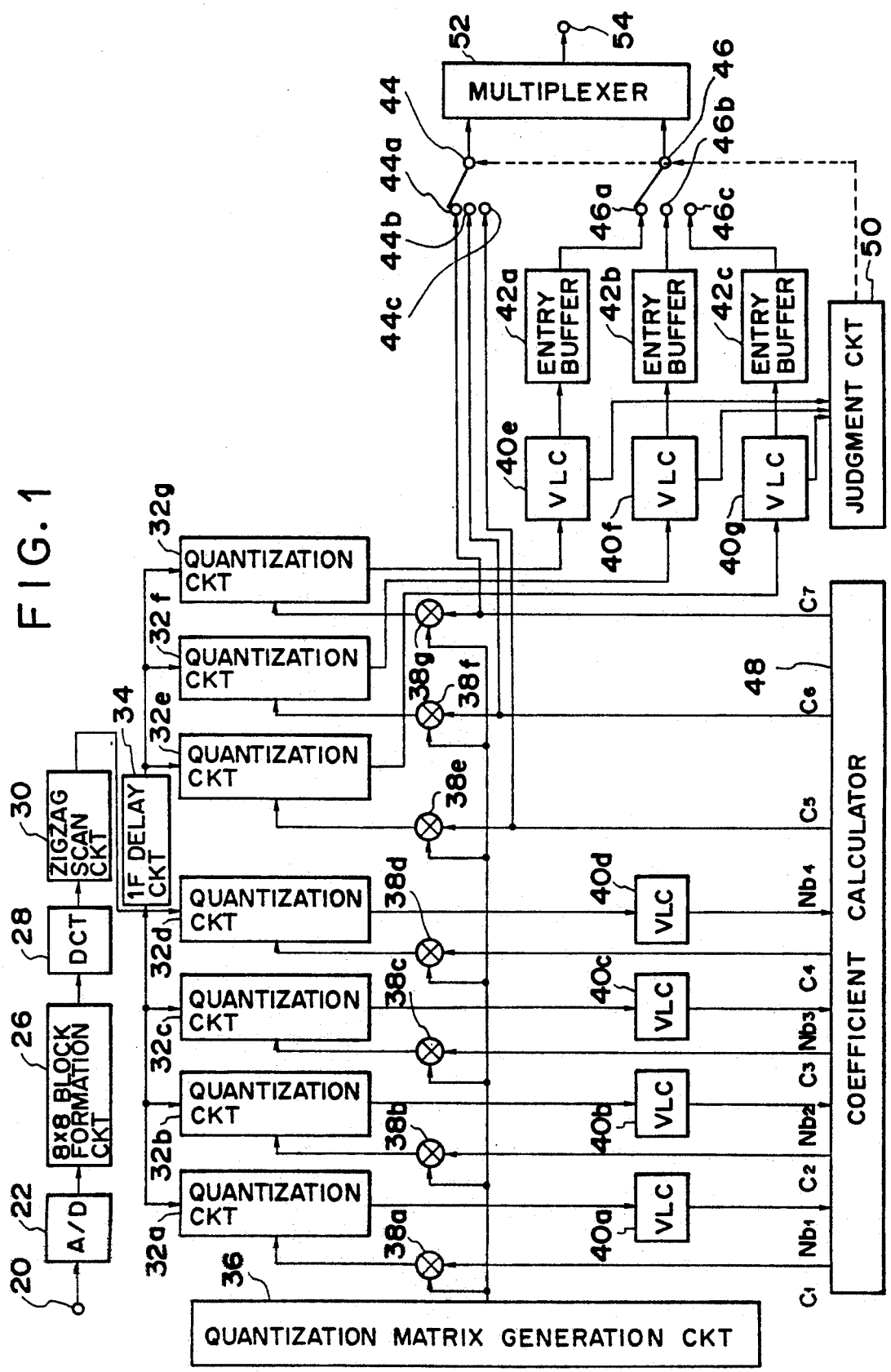
FIG. 1 is a view showing a first embodiment of the present invention.

The embodiments of this invention will be described below in detail. FIG. 1 is a block diagram showing the first embodiment of this invention.

In this figure, numeral 20 denotes an input terminal of an analog television signal. A television signal input through the terminal 20 is digitized by an A/D converter 22 into 8-bit data. The 8-bit data is then divided by an 8×8 block formation circuit 26 into 8×8 pixel blocks, and supplied to a DCT converting circuit 28 block by block. The 8×8 block formation circuit 26 operates in the same manner as the block formation circuit 4 shown in FIG. 3.

As in FIG. 3, pixel data items $D_{11}$ to $D_{88}$ in blocks are converted by the DCT converting circuit 28 into data matrices $X_{11}$ to $X_{88}$ regarding the frequency zones, and are supplied to a zigzag scan circuit 30. The zigzag scan circuit 30 operates in the same manner as the zigzag scan circuit 10 shown in FIG. 3, and outputs the DCT converted data matrices $X_{11}$ to $X_{88}$ in the order of $X_{11}$, $X_{12}$, $X_{21}$, $X_{31}$, $X_{22}$, $X_{13}$, $X_{14}$, $X_{23}$, $X_{32}$, $X_{41}$ ... $X_{85}$, $X_{86}$, $X_{77}$, $X_{68}$, $X_{78}$, $X_{87}$ and $X_{88}$.

A quantization matrix generation circuit 36 generates the quantized matrices $X_{11}$ to $X_{88}$. However, in this embodiment, since data which has already been quantized is input to quantization circuits 32a to 32d, the quantized matrices $X_{11}$ to $X_{88}$ are generated in an order corresponding to the order of zigzag scanning, and supplied to multipliers 38a to 38d.

Initial coefficients $C_1$ to $C_4$, serving as control coefficients C, are fed from a coefficient calculator 48 to the multipliers 38a to 38d, respectively. In the same manner as in the conventional art described previously, the multipliers 38a to 38d calculate the quantized matrices $X_{11}$ to $X_{88}$ and the control coefficients $C_x$ using an equation $(W_{ij} \times C_x / C_0)$, and output them to the quantization circuits 32a to 32d. The quantization circuits 32a to 32d quantize conversion coefficients, which are controlled by the control coefficients $C_1$ to $C_4$, and zigzag-scanned in a quantizing step. The quantization circuits 32a to 32d output these coefficients to variable length coders (VLCs) 40a to 40d.

In this embodiment, the VLCs 40a to 40d do not output data which has actually been encoded, but only output information nb1 to nb4 regarding the total number of bits of each screen when the VLCs 40a to 40d perform the same process as the VLC 12 shown in FIG. 3.

The coefficient calculator 48 calculates a control coefficient $C_5$ used for the desired total number of bits and outputs it to a multiplier 38e. This calculation is performed using the control coefficients $C_1$ to $C_4$ and the information nb1 to nb4 output from the VLCs 40a to 40d, respectively.

The coefficient calculator 48 outputs control coefficients $C_6$ and $C_7$, which are values approximate to the control coefficient $C_5$, to multipliers 38f and 38g and to terminals 44a to 44c of a switch 44.

However, when $C_5$ is greater than or equal to $C_n$ and less than or equal to $C_{n+1}$ ($C_n \leq C_5 \leq C_{n+1}$), then $C_6$ is greater than or equal to $C_n$ and less than $C_5$ ($C_n \leq C_6 < C_5$), and $C_7$ is greater than $C_5$ and less than or equal to $C_{n+1}$ ($C_5 < C_7 \leq C_{n+1}$), where n is greater than or equal to 1 and less than or equal to 3 ($1 \leq n \leq 3$).

The matrixes and the coefficients are calculated by the quantization matrix generation circuit 36 and using the control coefficients $C_5$ to $C_7$. In the same way as the above-mentioned multipliers 38a to 38d, the multipliers 38e to 38g output the matrixes and the control coefficients to quantization circuits 32e to 32g during a vertical blanking period.

A DCT conversion coefficient is output from the zigzag scan circuit 30, delayed by a one-frame delay circuit 34, and then input to quantization circuits 32e to 32g.

The quantization circuits 32e to 32g quantize the conversion coefficient, which has been controlled by the control coefficients $C_5$ and $C_6$ in a quantizing step, and output it to variable length coders (VLCs) 40e to 40g. In this embodiment, the VLCs 40e to 40g not only output data which has actually been encoded to entry buffers 42a to 42c, but also output the total number of bits nb5 to nb7 to a judgment circuit 50. The judgment circuit 50 outputs, to switches 44 and 46, data which selects the result of quantizing the conversion coefficient so that the result is nearest but not more than the desired total number of bits. The entry buffers 42a to 42c accumulate encoded data until the judgement circuit 50 outputs the result of judgement. The switch 44 selects the control coefficients on the basis of the judgement, and outputs them to a multiplexer 52. The switch 46 selects the encoded data, and outputs it to the multiplexer 52. The multiplexer 52 multiplexes the control coefficients and encoded data, and outputs them to an output terminal 54.

Figure 2:
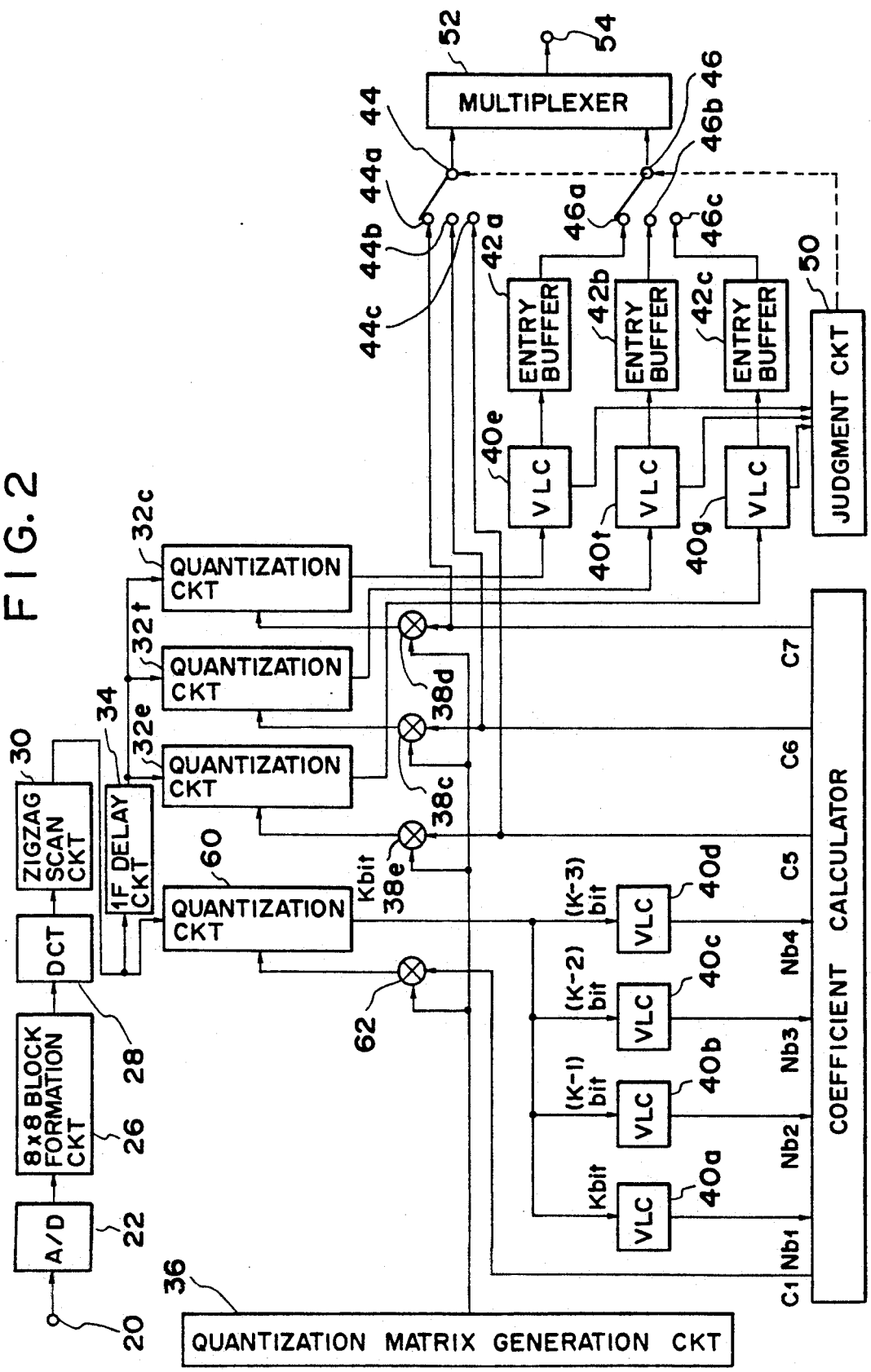
FIG. 2 is a view showing a second embodiment of this invention.

FIG. 2 is a block diagram showing the second embodiment of this invention. Components operating in the same manner as those in the first embodiment are identified by the same reference characters.

A DCT coefficient from a zigzag circuit 30 is output to a one-frame delay circuit 34 and a quantization circuit 60. A multiplier 62 first calculates an initial coefficient $C_1$ and quantized matrices $W_{11}$ to $W_{38}$ output from a quantization matrix generation circuit 36. The multiplier 62 then outputs the coefficient and quantized matrices to the quantization circuit 60. The initial control coefficient $C_1$ is output from a coefficient calculator 64. The quantization circuit 60 quantizes the DCT coefficient which has been controlled by the control coefficient $C_1$, and outputs it to variable length coders (VLCs) 40a to 40d, this quantization being performed in a quantizing step. If the total number of bits of the quantized DCT coefficient is K bits, K bits are output to the VLC 40a; (K-1) bits are output to the low-order bit of the VLC 40b; (K-2) bits are output to the low-order bit of the VLC 40c; and (K-3) bits are output to the low-order bit of the VLC 40d. As in the first embodiment, the VLCs 40a to 40d do not output encoded data, but output to the coefficient calculator 64 only information nb1 to nb4 regarding the total number of bits of each screen. The output of the quantization circuit 60 is shifted 0 to 3 bits toward a low-order direction, and then connected. By such an operation, the VLC 40a changes a quantized output which is controlled by the initial control coefficient $C_1$, into a variable length code; the VLC 40b changes a quantized output, which is quantized using a step size twice that of the initial control coefficient $C_1$, into a variable length code; the VLC 40c changes a quantized output, which is quantized using a step size four times that of the initial control coefficient $C_1$, into a variable length code; the VLC 40d changes a quantized output, which is quantized using a step size eight times that of the initial control coefficient $C_1$, into a variable length code. In other words, the amount of data, nb1 to nb4, formed into variable length codes represents the amount of data encoded by control coefficients $C_1$, $C_1 \times 2$, $C_1 \times 4$ and $C_1 \times 8$. It is thus possible to decrease the number of encoders and to simplify the structure of circuitry by shifting bits.

The coefficient calculator 64 determines a control coefficient $C_5$ with respect to the desired amount of encoding. This determination is based upon the amount of data, nb1 to nb4, formed into the variable length codes corresponding to the control coefficients $C_1$, $C_1 \times 2$, $C_1 \times 4$, and $C_1 \times 8$. The coefficient calculator 64 also determines not only $C_6 = C_5 - \alpha$, serving as a value approximate to the control coefficient $C_5$, but also $C_7 = C_5 + \alpha$, serving as a value approximate to the control coefficients $C_6$ and $C_7$. It outputs the control coefficients $C_5$ to $C_7$ to multipliers 38e to 38g, respectively. A process thereafter is performed in the same manner as in the first embodiment.

As has been described above, the image encoder of this invention, which quantizes data obtained by transforming image information to a frequency zone so as to form such data into variable length codes, is capable of setting the amount of data at every predetermined time interval to the desired amount and processing the data at very high speed.

The present invention may be applied to processing images in motion as well as at rest.

Bits may be shifted one by one or two by two.

Instead of controlling control coefficients, the contents of a quantization table may be changed.

The present invention is not limited to the embodiments described above, and various modifications and application may be possible within the scope of the claim.

We claim:

1. An image processing apparatus comprising:
   input means for inputting image data;
   quantizing means for quantizing the image data and outputting quantized digital data;
   first encoding means for encoding the quantized digital data and outputting first information regarding a number of bits of the quantized digital data as encoded;
   shifting means for performing a bit shift on the quantized digital data in order to reduce an amount of the quantized digital data and outputting bit shifted quantized digital data;
   second encoding means for encoding the bit shifted quantized digital data output from said shifting means and outputting second information regarding a number of bits of the bit shifted quantized digital data as encoded;
   calculating means for calculating a suitable quantizing parameter for quantizing the image data in accordance with the first and second information.

2. An image processing apparatus according to claim 1 further comprising means for directly converting said image data.

3. An image processing apparatus according to claim 1 further comprising second quantizing means for performing quantization based on said quantizing parameter.

4. An image processing apparatus according to claim 1, wherein said suitable parameter is a parameter which is set so that the amount of encoded image data of one screen is less than a predetermined amount.

5. An image processing apparatus according to claim 1, wherein said first and second encoding means parallelly perform encoding.

6. An image processing apparatus according to claim 5 further comprising delaying means for delaying the image data while said first and second encoding means perform encoding.

7. An image processing apparatus according to claim 1, wherein said apparatus is an apparatus for encoding moving images.

8. An image processing method comprising the steps of:

an input step of inputting image data;

a quantizing step of quantizing the image data and outputting quantized digital data;

a first encoding step of encoding the quantized digital data and outputting first information regarding a number of bits of the quantized digital data as encoded;

a shifting step of performing a bit shift on the quantized digital data in order to reduce an amount of the quantized digital data and outputting bit shifted quantized digital data;

a second encoding step of encoding the bit shifted quantized digital data output from said shifting means and outputting second information regarding a number of bits of the bit shifted quantized digital data as encoded;

a calculating step of calculating a suitable quantizing parameter for quantizing the image data in accordance with the first and second information.

* * * * *

UNITED STATES PATENT AND TRADEMARK OFFICE
CERTIFICATE OF CORRECTION

PATENT NO. : 5,301,040
DATED : April 5, 1994
INVENTOR(S) : NOBUHIRO HOSHI, ET AL.

It is certified that error appears in the above-identified patent and that said Letters Patent is hereby corrected as shown below:

<u>COLUMN 1</u>

Line 18, "adapt" should read --adopt--.
Line 27, "encode." should read --encoded.--.

<u>COLUMN 5</u>

Line 32, "$W_{38}$" should read --$W_{88}$--.

<u>COLUMN 6</u>

Line 47, "encoded;" should read --encoded; and--.

<u>COLUMN 8</u>

Line 9, "encoded;" should read --encoded; and--.

Signed and Sealed this

Eighteenth Day of October, 1994

Attest:

BRUCE LEHMAN

*Attesting Officer*     *Commissioner of Patents and Trademarks*